United States Patent
Chen et al.

(10) Patent No.: US 10,362,295 B2
(45) Date of Patent: Jul. 23, 2019

(54) OPTICAL APPARATUS WITH BEAM STEERING AND POSITION FEEDBACK

(71) Applicant: APPLE INC., Cupertino, CA (US)

(72) Inventors: Denis G. Chen, San Jose, CA (US); Meng Zhang, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 189 days.

(21) Appl. No.: 15/597,166

(22) Filed: May 17, 2017

(65) Prior Publication Data
US 2018/0084241 A1 Mar. 22, 2018

Related U.S. Application Data

(60) Provisional application No. 62/396,252, filed on Sep. 19, 2016.

(51) Int. Cl.
| | |
|---|---|
| G02B 26/08 | (2006.01) |
| G02B 26/10 | (2006.01) |
| G02B 27/10 | (2006.01) |
| G02B 27/30 | (2006.01) |
| G02B 27/42 | (2006.01) |
| G02B 27/64 | (2006.01) |
| H04N 13/218 | (2018.01) |
| H04N 13/254 | (2018.01) |
| H04N 13/271 | (2018.01) |

(52) U.S. Cl.
CPC ....... *H04N 13/271* (2018.05); *G02B 26/0875* (2013.01); *G02B 26/10* (2013.01); *G02B 27/106* (2013.01); *G02B 27/1086* (2013.01); *G02B 27/30* (2013.01); *G02B 27/4233* (2013.01); *G02B 27/646* (2013.01); *H04N 13/218* (2018.05); *H04N 13/254* (2018.05)

(58) Field of Classification Search
CPC .. H04N 13/271; H04N 13/218; H04N 13/254; G02B 26/10; G02B 26/0875; G02B 27/646; G02B 27/30; G02B 27/106; G02B 27/4233; G02B 27/1086
USPC .......................................................... 348/49
See application file for complete search history.

(56) References Cited

U.S. PATENT DOCUMENTS

| | | |
|---|---|---|
| 5,552,893 A | 9/1996 | Akasu |
| 5,677,970 A | 10/1997 | Nashimoto |
| 5,808,656 A | 9/1998 | Goldmann |
| 6,680,788 B1 | 1/2004 | Roberson et al. |

(Continued)

FOREIGN PATENT DOCUMENTS

DE      10146692 A1      4/2003

OTHER PUBLICATIONS

Niclass et al., "A Single Photon Detector Array with 64×64 Resolution and Millimetric Depth Accuracy for 3D Imaging", ISSCC 2005 / Session 19 / Imagers / 19.10, 3 pages, Feb. 8, 2005.

(Continued)

*Primary Examiner* — Marnie A Matt
(74) *Attorney, Agent, or Firm* — Kligler & Associates

(57) ABSTRACT

A method for projection includes projecting a pattern toward a target by directing optical radiation, which is collimated along an optical axis by projection optics, through a diffractive optical element (DOE). An optical signal that is indicative of a shift of the projected pattern is detected. An actuator is driven to translate the projection lens in a direction transverse to the optical axis responsively to the detected optical signal.

20 Claims, 11 Drawing Sheets

(56) References Cited

U.S. PATENT DOCUMENTS

| | | | |
|---|---|---|---|
| 9,268,012 B2 | 2/2016 | Ghosh et al. | |
| 9,325,973 B1 * | 4/2016 | Hazeghi | G01B 11/2513 |
| 9,553,423 B2 | 1/2017 | Chen et al. | |
| 9,826,216 B1 * | 11/2017 | Hazeghi | G02B 27/0075 |
| 9,981,604 B2 | 5/2018 | Sakai | |
| 2007/0181810 A1 | 8/2007 | Tan et al. | |
| 2015/0219764 A1 | 8/2015 | Lipson | |
| 2016/0025993 A1 | 1/2016 | Mor et al. | |
| 2017/0176249 A1 | 6/2017 | Fournier et al. | |

OTHER PUBLICATIONS

Bills et al., U.S. Appl. No. 15/250,962, filed Aug. 30, 2016.
International Application # PCT/US2017/039163 search report dated Sep. 29, 2017.
Niclass et al., "Design and characterization of a 256×64-pixel single-photon imager in CMOS for a MEMSbased laser scanning time-of-flight sensor", Optics Express, vol. 20, No. 11, pp. 11863-11881, May 10, 2012.
U.S. Appl. No. 15/250,962 office action dated Nov. 29, 2018.

* cited by examiner

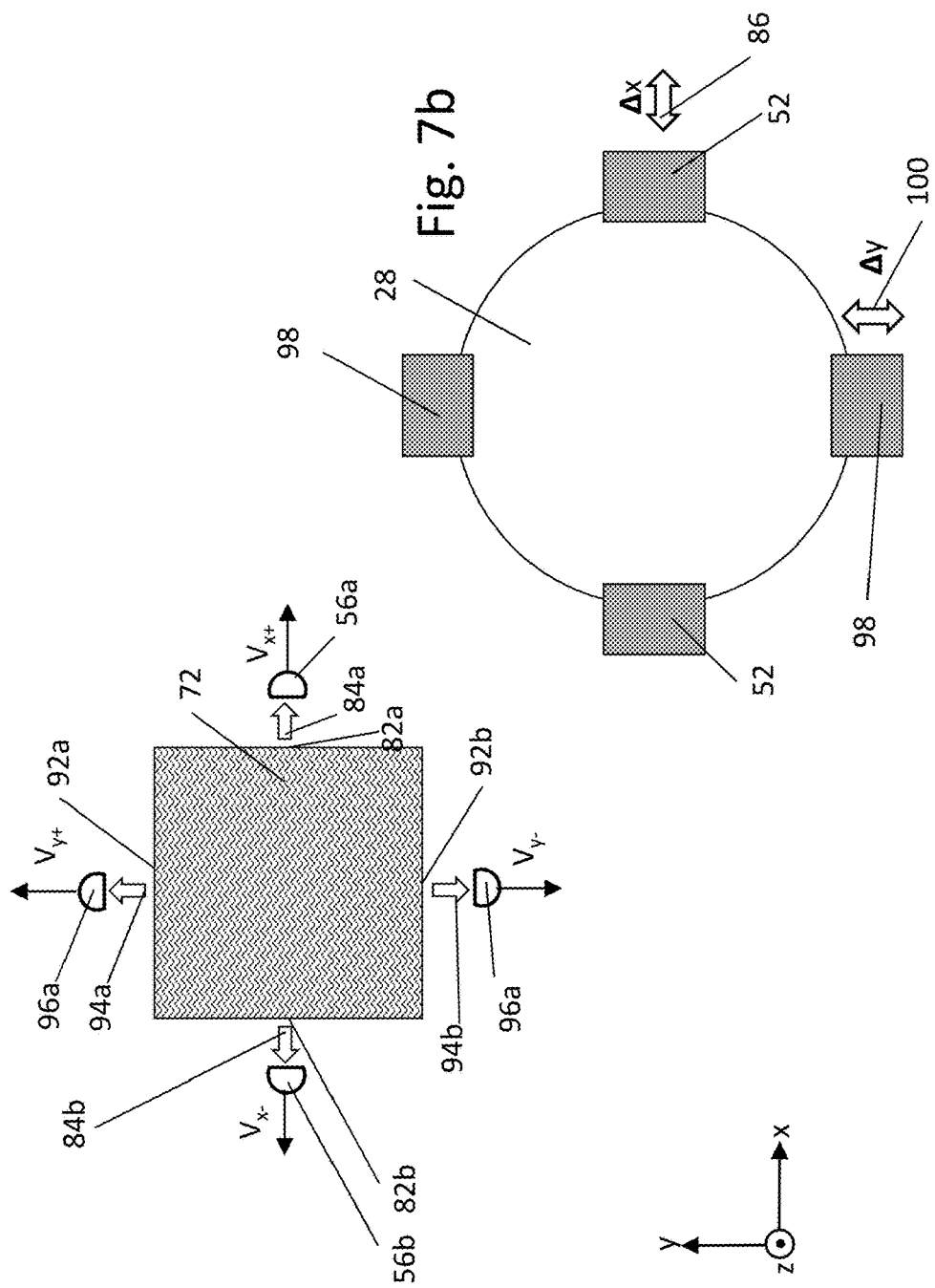

OPTICAL APPARATUS WITH BEAM STEERING AND POSITION FEEDBACK

CROSS-REFERENCE TO RELATED APPLICATION

This application claims the benefit of U.S. Provisional Patent Application 62/396,252, filed Sep. 19, 2016, which is incorporated herein by reference.

FIELD OF THE INVENTION

The present invention relates generally to optical systems, and particularly to high-resolution optical scanning and depth mapping.

BACKGROUND

Existing and emerging consumer applications have created an increasing need for real-time three-dimensional (3D) imagers. These imaging devices, also commonly known as depth sensors or depth mappers, enable the remote measurement of distance (and often intensity) of each point on a target scene—so-called target scene depth—by illuminating the target scene with one or more optical beams and analyzing the reflected optical signal.

A commonly used technique for determining the distance to each point on the target scene involves sending an optical beam towards the target scene, followed by the measurement of the round-trip time, i.e. time-of-flight (ToF), taken by the optical beam as it travels from the source to target scene and back to a detector adjacent to the source.

Another commonly used technique is based on projecting a pattern of structured light onto a scene and capturing an image of the projected pattern. The distance to each point in the scene is derived from the local displacement of the pattern.

Target scene depth is measured for the points illuminated by the projected beams. Consequently, it is advantageous to increase the number of beams, either for higher lateral resolution or for a wider coverage of the target area. One method for increasing the resolution using a diffractive optical element (DOE) is described in United States Patent Application Publication 2016/0025993, whose disclosure is incorporated herein by reference.

SUMMARY

An embodiment of the present invention provides optical apparatus, which includes a pattern projector, including optical components arranged along an optical axis. The optical components include a radiation source, which is configured to emit optical radiation. Projection optics are configured to collect and collimate the optical radiation emitted by the radiation source. A diffractive optical element (DOE) is positioned to receive the optical radiation collimated by the projection optics and to produce and project a pattern toward a target. An actuator is configured to translate the projection optics in a direction transverse to the optical axis. An optical sensor is configured to detect an optical signal that is indicative of a shift of the projected pattern. A processor is configured to drive the actuator to translate the projection optics responsively to the optical signal detected by the optical sensor.

In a disclosed embodiment, the radiation source emits the optical radiation with a predefined spatial pattern, and the pattern projected by the DOE includes multiple replicas of the predefined spatial pattern.

In one embodiment, a portion of the collimated radiation received by the DOE is diffracted by the DOE to orders that propagate inside the DOE to a side surface of the DOE and exit therefrom, and the sensor includes at least one radiation detector, which is positioned in proximity to the side surface so as to receive and sense an intensity of the radiation that has exited through the side surface.

In another embodiment, the apparatus includes a transparent substrate having a face shaped to define a plurality of optical deflectors and positioned parallel to the DOE so as to intercept and reflect a portion of the projected pattern, the transparent substrate including at least one side surface which is not parallel to the first face, and the sensor includes at least one radiation detector, which is positioned so as to receive and sense an intensity of the radiation reflected by the optical deflectors.

In still another embodiment, the apparatus includes at least one secondary radiation source, which is configured to direct further radiation to impinge on the DOE along a direction non-parallel to the optical axis, and the sensor includes at least one radiation detector positioned to receive a portion of the further radiation that is diffracted by the DOE. The at least one radiation detector can be mounted on a substrate together with the radiation source that emits the optical radiation projected in the pattern.

In a further embodiment, the sensor includes multiple optical detectors disposed on different sides of the optical axis. The actuator can be configured to translate the projection optics in multiple directions transverse to the optical axis responsively to signals from the multiple optical detectors.

In a disclosed embodiment, the apparatus includes a motion sensor configured to output a motion signal indicative of changes in a position of the optical apparatus, wherein the processor is configured to drive the actuator to both the optical signal and the motion signal.

In some embodiments, the processor is configured to drive the actuator responsively to the optical signal so as stabilize the projected pattern.

Alternatively or additionally, the apparatus includes a receiver, which is configured to form an image of the pattern on the target, wherein the processor is configured to process the image so as to generate a three-dimensional (3D) map of the target. In some embodiments, the processor is configured to drive the actuator in order to shift the projected pattern so as to enhance a resolution of the 3D map.

There is also provided, in accordance with an embodiment of the invention, a method for projection, which includes projecting a pattern toward a target by directing optical radiation, which is collimated along an optical axis by projection optics, through a diffractive optical element (DOE). An optical signal that is indicative of a shift of the projected pattern is detected. An actuator is driven to translate the projection lens in a direction transverse to the optical axis responsively to the detected optical signal.

The present invention will be more fully understood from the following detailed description of the embodiments thereof, taken together with the drawings in which:

BRIEF DESCRIPTION OF THE DRAWINGS

FIGS. 7a-b are schematic top views of sections of a projector with angular beam scanning, in accordance with an embodiment of the invention;

DETAILED DESCRIPTION OF EMBODIMENTS

Overview

Figure 1:
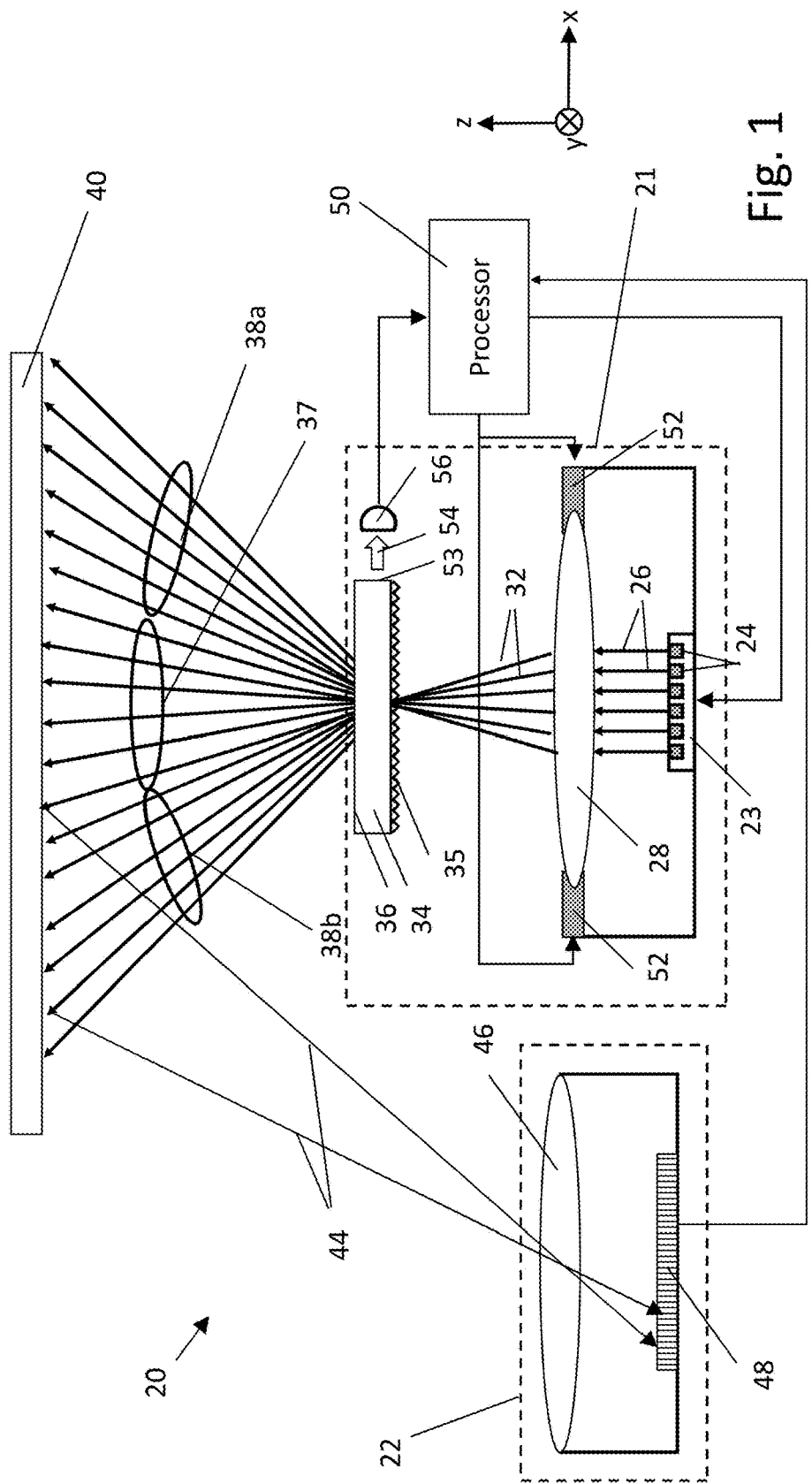
FIG. 1 is a schematic side view of optical apparatus with beam scanning, in accordance with an embodiment of the invention.

Depth sensors measure the distance to each point on a target scene (target scene depth) by illuminating the target scene with one or more optical beams from a primary light source and analyzing the reflected optical signals. The terms "light" and "optical," as used in the context of the present description and in the claims, refer to optical radiation in any of the visible, infrared, and ultraviolet ranges.

A major challenge to the irradiance of the projected depth mapping illumination is presented by uncorrelated background light. This challenge can be met by using as the primary light source laser arrays with high-radiance emitted beams, such as an array of high-intensity vertical-cavity surface-emitting lasers (VCSELs), yielding an irradiance on the target scene exceeding the level of the uncorrelated background irradiance. This, in turn, leads to a high ratio of signal to background (SBR), as well as to a high ratio of signal to noise (SNR) in detection of the beams. The laser arrays may be either orderly arrays, such as a square or rectangular matrix, or random or pseudo-random arrays. In the following, the embodiments of the present invention are described with reference to VCSEL arrays, although other sorts of radiation sources may also be used.

By optically spreading and multiplying the beams emitted by the laser array, either the field-of-view (FOV) of the illuminated target scene may be increased, or the density of beams in a given FOV may be increased. Alternatively, a tradeoff between increased overall FOV and increased local density of beams may be preferred. However, with a given spatially static array of illuminating beams, the lateral resolution (i.e., the resolution in a plane transverse to the beam axes) of the target scene depth measurement is determined (and limited) by the local pitch of the projected pattern.

The depth resolution, determined to a large extent by the SNR, is limited by the power available from each element of the laser array. The SNR is further limited by the available exposure time due to motion blur and uncorrelated background light.

The embodiments of the present invention that are described herein address the above limitations so as to enable compact, reliable, robust, and low-cost projectors for depth imaging with enhanced lateral resolution, combined with highly accurate lateral placement of the beams. An increased lateral resolution of the target scene depth measurement is achieved by angularly scanning, in unison, the beams emitted by the pulsed laser array, typically by controlled translation of the projection optics. In general, the scan resolution is finer than the angular pitch of the projected pattern.

Accurate beam placement is ensured by calibrating the position of the scanning element with respect to the scan angles, monitoring in real-time the position of the scanning element, and closing the control loop between the desired scan angles and the position of the scanning element. This closed-loop control ensures accurate beam placement both under static conditions and under dynamic conditions, such as external vibrations. This control scheme mitigates motion blurring, permits longer exposure times, and increases the SNR. Furthermore, by steering the projected dot array in a measured fashion, in conjunction with spatial filtering of images of the projected pattern, the SNR and resolution can be further increased.

An external sensor of the motion of the projector (and receiver) may be used to provide an additional control loop for stabilizing the position of the projected beam array on a static target scene. This feedback further mitigates motion blurring, and increases the SNR of individual target points. Another option for the use of the information from an external motion or position sensor is to feed-forward the information to the post-processing of the target depth data in order to correct for the motion of the projector and receiver, thus increasing the accuracy of the target depth sensing and the spatial resolution of the final 3D map.

In the disclosed embodiments of the present invention, the optical beams are emitted by an array of radiation sources, such as a VCSEL array. Alternatively, other sorts of radiation sources may be used. As will be described in more detail in the context of the figures, the beams are intercepted by projection optics and collimated and projected towards a DOE, which in turn diffracts each of the beams into several diffracted orders towards the target scene. By translating the projection optics transversely with respect to its optical axis, the beams exiting from the projection optics are pivoted angularly, in accordance with principles of geometrical optics. This pivoting constitutes the previously mentioned angular scan of the projected beams.

In order to control the translation of the projection optics to achieve a desired angular scan, the actual magnitude of the translation is monitored and compared to calibrated values. A number of methods for monitoring the translation of the projection optics are described in more detail in the context of the figures, and will be briefly summarized here:

1) A first method is based on monitoring higher orders of primary radiation diffracted by the DOE. These are high orders that are diffracted from the projected beams at such angles that they propagate inside the DOE between its entrance face and exit face. Ultimately these propagating higher diffracted orders meet a sidewall of the DOE and exit through it. One or more radiation detectors, such as photodiodes, are positioned in proximity to the sidewall so as to receive and sense the exiting higher diffracted orders. As translating the projection optics changes the angles of the beams impinging on the DOE, the angles of the diffracted orders, including the higher diffracted orders, also change accordingly. The diffracted beams have an angle-dependent intensity distribution, and consequently the photodiodes in fixed locations, proximate to the sidewalls, sense a change in the received power with changing entrance angles of the beams impinging on the DOE. In this way the photodiodes sense the translation of the projection optics.

2) A second method is similar to the first one, except that now the diffracted orders projected towards the target scene are sampled by a mirror array. The mirror array comprises a transparent substrate parallel to the DOE, with a number of prism- or pyramid-shaped indentations in its surface. These indentations deflect a small portion of the diffracted orders into one or more directions primarily transverse to the optical axis, propagating within the mirror array. The deflected portions of the diffracted orders ultimately reach a sidewall of the mirror array, and exit through it. This radiation is received and sensed by one or more photodiodes. Based on the same arguments as for the first method, translating the projection optics has the effect of changing the power sensed by the photodiodes, and these photodiodes will respond to the translation.

3) In the third method, the DOE is illuminated by a secondary radiation source from a direction non-parallel to the optical axis, for instance a light-emitting diode (LED) or a diffused laser illuminating the DOE from its exit side. The secondary radiation source is located in an off-axis position, so that it does not interfere with the diffracted orders of the radiation projected towards the target scene. The radiation emitted by the secondary radiation source is diffracted by the DOE so that a portion of it passes through the projection optics in a direction opposite to that of the first radiation. This radiation is received and sensed by one or more photodiodes. A convenient location for these photodiodes is near the primary source of radiation, possibly on the same substrate, but they can be positioned in other locations, too. Translation of the projection optics now pivots the angle-dependent distribution of the second radiation. This, in turn, causes the power sensed by the photodiodes to change as a function of the translation of the projection optics.

System Description

FIG. 1 is a schematic side view of an optical apparatus 20 with beam scanning, in accordance with an embodiment of the invention. FIG. 1 illustrates the overall architecture of optical apparatus 20 according to the first method, described above. Optical apparatus 20 comprises a projector 21 and a receiver 22.

Projector 21 comprises a VCSEL array 23, comprising individual VCSELs 24 in either a regular, pseudo-random, or random spatial array, which emits an array of beams 26. Beams 26 impinge on projection optics 28, such as a suitable lens, and are refracted, collimated and projected into beams 32. The local angular pitch of beams 32 is determined by the local spatial pitch of VCSEL array 22 and the focal length of projection optics 28. Beams 32 impinge on DOE 34, which diffracts them into zero-order diffracted beams 37 and positive and negative first order diffracted beams 38a-b. Alternatively, DOE 34 may create a larger number of diffraction orders. Beams 26, 32, 37, and 38a-b are illustrated for the sake of clarity as rays, although beams 26 typically expand from a cross-section of approximately 100 microns at VCSEL array 23 to several millimeters at projection optics 28, and continue from there as collimated beams with a roughly constant cross-section. DOE 34 is illustrated in FIG. 1 as having a diffraction grating on an entrance face 35 and a smooth exit face 36. However, DOE 34 may comprise a grating on either or both faces, as well as one or more diffraction gratings on or between entrance face 35 and exit face 36.

In FIG. 1, zero-order diffracted beams 37 and first order diffracted beams 38a-b are illustrated as non-overlapping angular fans, thus covering a large FOV on a target scene 40. In other embodiments (not shown), the angular fans of different diffracted orders may overlap, yielding a locally higher density of beams over a smaller FOV. In still other embodiments, a larger number of orders are diffracted. As an example, in another embodiment DOE 34 comprises two gratings, one on entrance surface 35 and the other on exit surface 36, which are configured so that the first grating produces 9 diffraction orders in each of the planes xz and yz (as defined by the Cartesian coordinate system in FIG. 1), and the second grating further diffracts each of the 9 orders to 12 orders, also in two dimensions, for a total of 108×108 diffracted orders. The Cartesian coordinate system is used in FIG. 1 and in subsequent figures for the sake of clarity. However, the disclosed embodiment is not dependent on any specific system of coordinates.

Diffracted beams 37 and 38a-b impinge on target scene 40, from which they are reflected towards receiver 22. Target scene 40 is shown here, for the sake of simplicity, as an abstract flat surface, but in general, the target that is mapped has a more complex and possibly dynamic topology.

Receiver 22 receives an image of the pattern projected onto target scene 40, exemplified by two reflected beams 44 shown in FIG. 1. Receiver 22 comprises collection optics 46 and a detector array 48. A processor 50 drives VCSEL array 22 as well as receives signals from detector array 48 for calculating a depth map of target scene 40 based on the shift of reflected beams 44 on detector array 48. As will be detailed further hereinbelow, processor 50 is also capable of feedback control of projector 21 or feed-forward correction of the depth map or both. Although processor 50 is shown in FIG. 1 and further figures, for the sake of convenience, as a single functional block, in practice the functions of this "processor" may be implemented in two or more separate physical units. These functions may be implemented in software or in hardware logic or in a combination of software and hardware functions.

Figure 2:
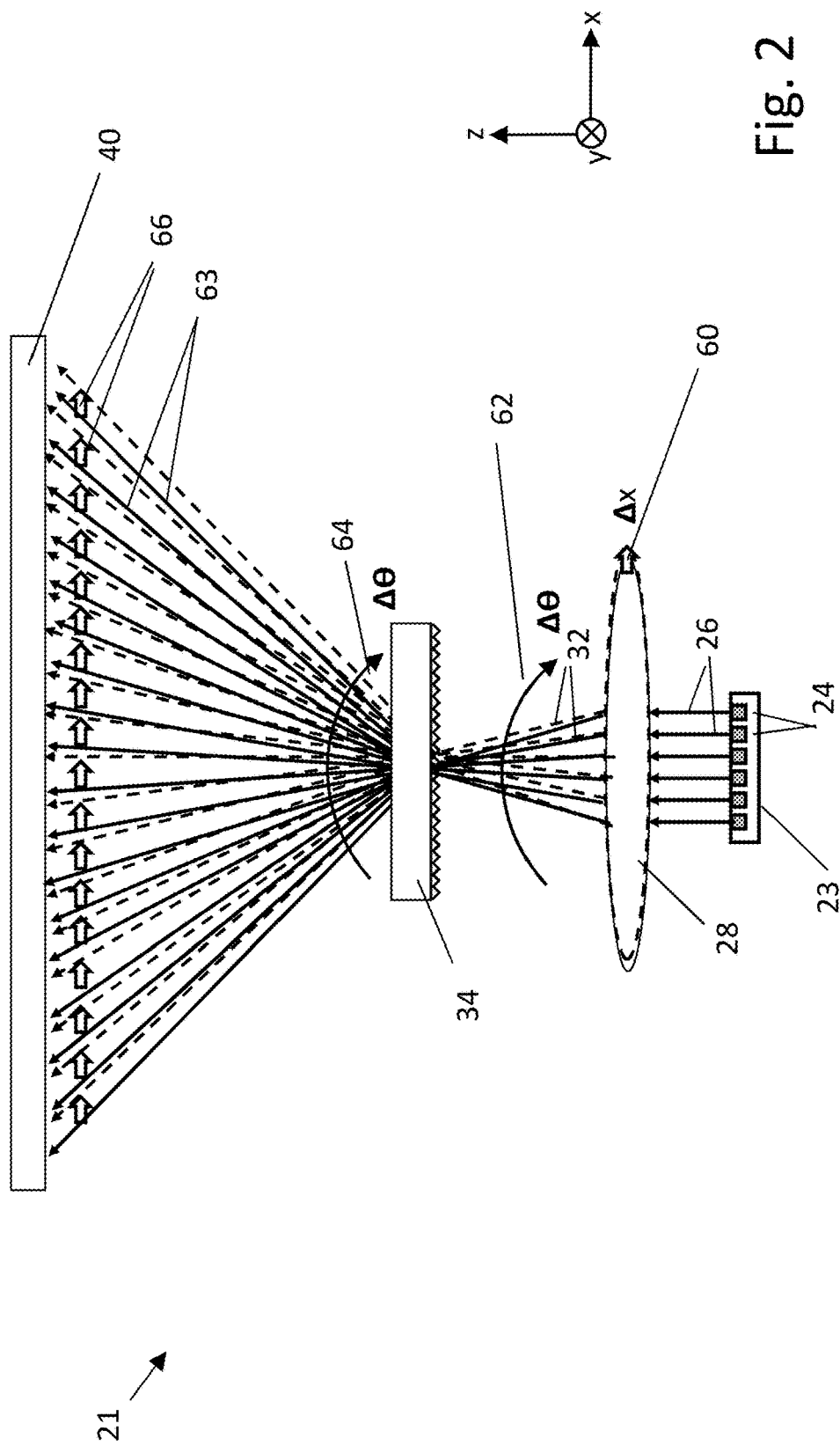
FIG. 2 is a schematic illustration of a projector with angular beam scanning, in accordance with an embodiment of the invention.

Projection optics 28 are attached to one or more actuators 52, which are configured to translate projection optics 28 transversely to its optical axis (the Z-axis in the figures), thus causing beams 32, 37, and 38a-b to be scanned angularly, as will be further detailed in FIG. 2. Actuators 52 may comprise, for example, piezoelectric actuators or voice coil linear engines. In the present embodiment, the translation of projection optics 28 is monitored based on higher diffracted orders, according to the first method described above. Higher diffracted orders exit through a sidewall 53 of DOE 34 as beams 54, which are received and sensed by one or more photodiodes 56 (one shown in FIG. 1). Both actuators 52 and photodiodes 56 are coupled to processor 50 for controlling the translation of projection optics 28. Using a calibration between scan angles and position of projection optics 28, as described in the context of FIGS. 7a-b, the feedback loop from monitoring the position of the projection optics through processor 50 to actuators 52 ensures accurate positioning of beams 37 and 38a-b under external mechanical disturbances, e.g., vibrations. This, in turn, mitigates motion blurring, permits longer exposure times, and increases the SNR.

FIG. 2 is a schematic illustration of projector 21 showing the principle of angular scanning of diffracted beams 63 (labelled as 37 and 38a-b in FIG. 1) based on transverse translation of projection optics 28, in accordance with an embodiment of the invention. For the sake of clarity, only the components of projector 21 essential for illustrating the angular scanning principle are shown. Also for the sake of clarity, components and beams affected by the transverse translation of projection optics 28 are drawn by solid lines in their basic (un-scanned) positions, and by dotted lines in their scanned positions.

Beams 26 emitted by VCSEL array 23 follow—in the basic position of projection optics 28—the paths described in FIG. 1, above. In order to illustrate the principle of angular scanning, projection optics 28 are translated to the right by an amount $\Delta x$, as indicated by an arrow 60. This translation rotates beams 32 clockwise by an angle $\Delta\theta$, as indicated by an arrow 62. The rotation angle $\Delta\theta$ is determined by the ratio of the transverse shift $\Delta x$ to the focal length of projection optics 28. Thus, for instance, a transverse shift of 0.5 mm of projection optics 28 with a focal length of 10 mm causes a rotation $\Delta\theta$ of 0.05 radians (~3°). This rotation carries over to diffracted beams 63, rotating them—to a first order—also by an angle $\Delta\theta$, as indicated by an arrow 64. (The fulcrum of the diffracted orders is also shifted laterally, but only by an amount equal to the shift $\Delta x$. The effect of this shift as compared to the angular scan is negligible). The rotation of the diffracted orders translates to a shift of the projected beams on target scene 40, as indicated by arrows 66.

In the remaining FIGS. 3-10, for the sake of clarity, only projector 21 of optical apparatus 20 is illustrated.

Figure 3:
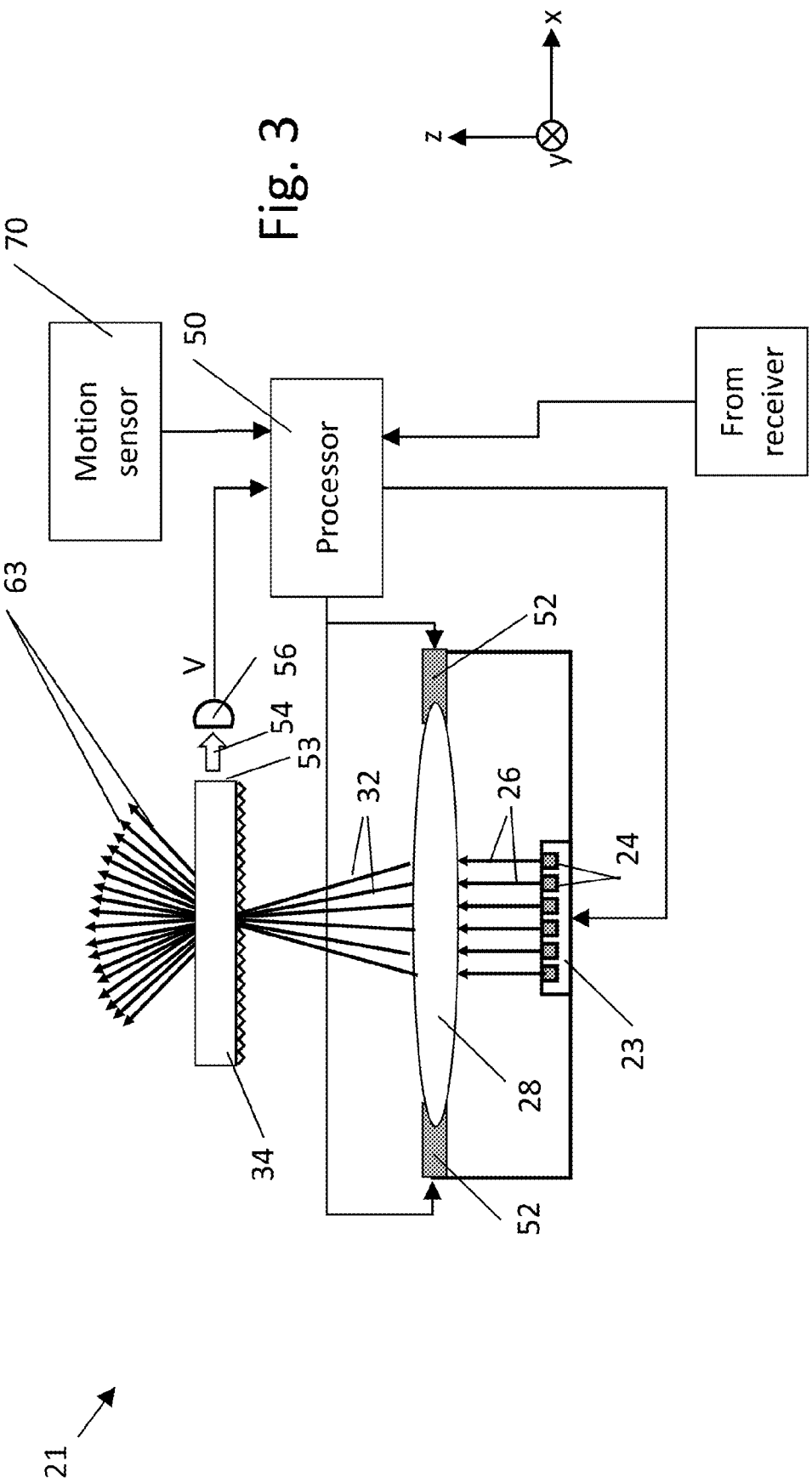
FIG. 3 is a schematic side view of a projector with angular beam scanning, in accordance with another embodiment of the invention.

FIG. 3 is a schematic side view of projector 21, in accordance with another embodiment of the invention, with the addition of a motion sensor 70 coupled to processor 50. Motion sensor 70 senses, either separately or as a combination, one or more of the following spatial attributes in a global reference frame of optical apparatus 20 (of which only projector 21 is shown in FIG. 3): linear or angular displacement, linear or angular velocity, and linear or angular acceleration. The spatial attributes sensed by motion sensor 70 are received by processor 50, and utilized by the processor either in a feedback mode or in a feed-forward mode, or as a combination of both.

In the feedback mode, processor 50 actively adjusts the angular scan $\Delta\theta$ diffracted beams 63, so as to stabilize the intercept of these beams with target scene (FIG. 1) into fixed locations, despite translation or rotation of optical apparatus 20. This stabilization, in addition to the feedback described in the context of FIG. 1, further mitigates motion blur, and thus the target depth is measured over an actual spot size, and the exposure time can be increased for increased SBR and SNR.

In the feed-forward mode, the information provided by sensor 70 regarding the movement of optical apparatus 20 is utilized by processor 50 to post-process the images captured by receiver 22 (FIG. 1) so as to cancel out the movement of illuminated spots on target scene 40, and in this way to increase the spatial accuracy of the target depth measurement. Combining the feedback and feed-forward modes enables utilizing the benefits of both of these modes simultaneously.

Figure 4:
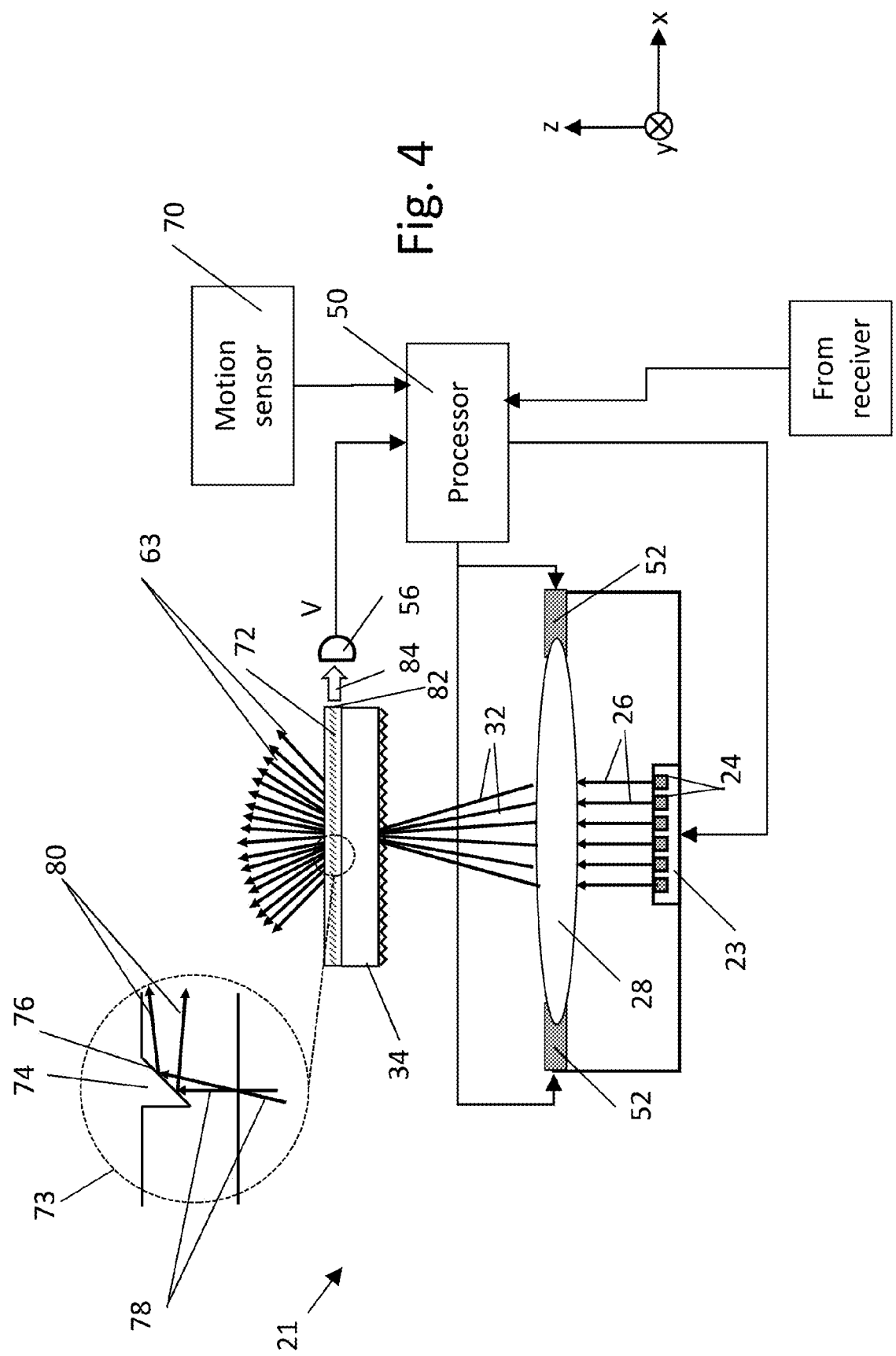
FIG. 4 is a schematic side view of a projector with angular beam scanning, in accordance with yet another embodiment of the invention.

FIG. 4 is a schematic side view of projector 21 with beam scanning, in accordance with yet another embodiment of the invention. Beams 26 emitted by VCSEL array 23 follow—in the absence of scan—the paths previously described in FIG. 1.

Diffracted orders 63 projected towards target scene 40 (FIG. 1) are sampled by a mirror array 72, described above with regard to the second method. Mirror array 72 comprises a transparent substrate parallel to DOE 34. One surface of array 72 comprises a number of prism- or pyramid-shaped indentations, such as a prism-shaped indentation 74 shown in an enlarged image 73. Indentation 74 deflects a small portion 78 of projected diffracted orders 63 into a direction primarily transverse to the optical axis. A deflected portion 80 of the diffracted orders propagates within mirror array 72 and exits through a sidewall 82 of the mirror array as beams 84. Beams 84 are received and sensed by one or more photodiodes 56 (one shown in FIG. 4). Further details regarding possible implementations of a mirror array of this sort are described in U.S. patent application Ser. No. 14/975,889, filed Dec. 21, 2015, whose disclosure is incorporated herein by reference.

Figure 5:
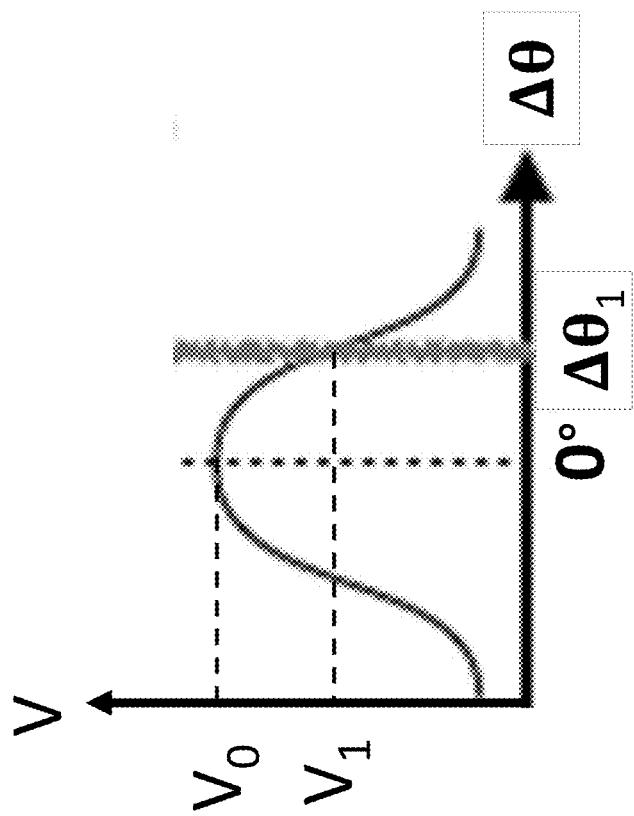
FIG. 5 is a schematic plot of the response of a translation sensor, in accordance with an embodiment of the invention.

FIG. 5 is a schematic illustration of the response of photodiodes 56 to translation of optics 28, in accordance with an embodiment of the invention. A photodiode, such as photodiode 56 of FIGS. 3-4, receives and senses an optical signal due to beam 54 or 84, and outputs a voltage signal V, which is a function of the angular rotation $\Delta\theta$ of beams 32 and diffracted beams 63. Beams 54 and 84 have an angular intensity distribution that peaks, for example, in the un-scanned position of projection optics 28. Consequently, V as a function of $\Delta\theta$ is a plot peaked at $\Delta\theta=0$, as illustrated in FIG. 5. When projection optics 28 are in the un-scanned position, $\Delta\theta=0$ and the corresponding voltage signal from photodiode 56 is $V_0$. When projection optics 28 are translated to a position corresponding to a rotation angle $\Delta\theta_1$, the corresponding voltage signal decreases to $V_1$. In this way, the voltage signal from photodiode 56 indicates the magnitude of rotation angle $\Delta\theta$. For purposes of stabilization, processor 50 attempts to drive actuators 52 to return the voltage to the value $V_0$.

Figure 6:
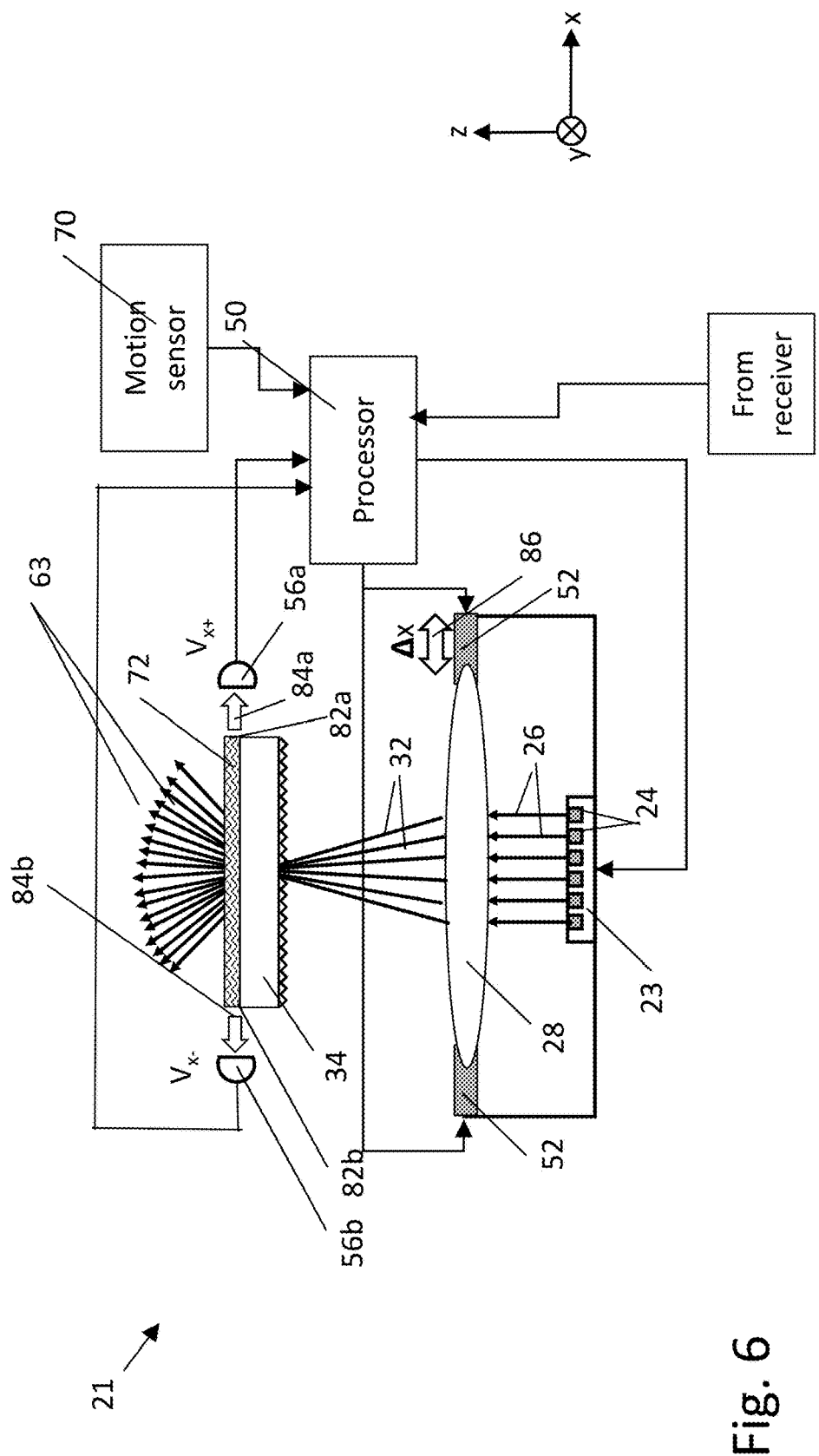
FIG. 6 is a schematic side view of a projector with angular beam scanning, in accordance with an embodiment of the invention.

FIG. 6 is a schematic side view of projector 21 with beam scanning, in accordance with another embodiment of the invention. This embodiment involves the same beam paths as in FIG. 4, and diffracted beams 63 are sampled by mirror array 72, as in FIG. 4. In the present embodiment, however, the deflectors of mirror array 72 are configured to deflect the sampled beams into two opposite directions in the plane of the mirror array. The sampled beams propagating in the positive x-direction exit mirror array 72 through a sidewall 82a as beams 84a, and are received and sensed by a photodiode 56a, emitting voltage signal $V_{x+}$. The sampled beams propagating in the negative x-direction exit mirror array 72 through a sidewall 82b as beams 84b, and are received and sensed by a photodiode 56b, emitting voltage signal $V_{x-}$. Signals $V_{x+}$ and $V_{x-}$ are used by processor 50 as a differential signal $V_x=V_{x+}-V_{x-}$. High-order diffraction modes within DOE 34, as described above with reference to FIGS. 1 and 2, may be sensed and sampled in similar fashion.

FIGS. 7a-b are schematic top views of sections of projector 21 with beam scanning in two dimensions, in accordance with another embodiment of the invention.

FIG. 7a illustrates two-dimensional orthogonal sensing of diffracted beams sampled by mirror array 72. In this embodiment, the mirror array samples diffracted beams 63 and deflects the sampled beams into positive and negative x- and y-directions. Diffracted beams deflected in the positive y-direction exit mirror array 72 through sidewall 92a as beams 94a, and are sensed by photodiode 96a, emitting voltage signal $V_{y+}$. Diffracted beams deflected in the negative y-direction exit mirror array 72 through sidewall 92b as beams 94*b*, and are sensed by photodiode 96*b*, emitting voltage signal $V_{y-}$. Again, higher-order diffraction modes within DOE 34 may be sensed and sampled in similar fashion.

FIG. 7*b* illustrates actuators 52 and 98 for two-dimensional scanning of projection optics 28. As illustrated in FIG. 6, the translation in the x-direction is effected by actuators 52, with a translation Δx indicated by arrow 86. The translation in the y-direction is effected by actuators 98, with translation Δy indicated by an arrow 100.

The four signals $V_{x+}$, $V_{x-}$, $V_{y+}$, and $V_{y-}$ are all coupled to processor 50 (FIG. 6). Processor 50 calculates differential signals $V_x = V_{x+} - V_{x-}$ and $V_y = V_{y+} - V_{y-}$. The angular scans of diffracted beams 63 comprise two scan angles, Δθ and Δϕ, wherein Δθ is the scan angle in the xz-plane (illustrated in FIG. 2), and Δϕ is the scan angle in the orthogonal yz-plane. For an accurate translation of projection optics 28, a calibration is performed between, on one hand, the differential signals $V_x$ and $V_y$, and on the other hand, the scan angles Δθ and Δϕ.

Two calibration methods for this purpose are described below by way of example:

The first calibration method comprises driving actuators 52 and 98 separately. First, actuators 52 are driven to multiple positions over their range, thus translating projection optics 28 in the x-direction to different values of Δx. The scan angle Δθ can be measured by an external camera (not shown), which observes target scene 40 and measures the translation of projected beams 63 on the target scene. From the measured translations of diffracted beams 63 on target scene 40 and from the distance between target scene 40 and projector 21, the scan angles Δθ are calculated for each translation Δx.

Simultaneously, the respective values of differential signal $V_x$ are measured for each translation Δx. This measurement maps the scan angle Δθ against the differential signal $V_x$, and the pairs of values ($V_x$, Δθ) are stored in a look-up table by processor 50.

In a similar way, projection optics 28 are translated in the y-direction by driving actuators 98. The scan angles Δϕ are determined as were the angles Δθ previously and are mapped to the measured signals $V_y$, and the pairs of values ($V_y$, Δϕ) are stored in another look-up table by processor 50.

During actual depth mapping, processor 50 accesses the look-up tables for the value pairs ($V_x$, Δθ) and ($V_y$, Δϕ) and uses the values in determining the scan angles Δθ and Δϕ from the differential signals $V_x$ and $V_y$. For differential signals $V_x$ and $V_y$ between the values in the look-up tables, the scan angles Δθ and Δϕ may be determined by processor 50 by interpolating the values in the look-up tables.

The second calibration method comprises describing the mapping between, on one hand, the differential signals $V_x$ and $V_y$, and, on the other hand, the scan angles Δθ and Δϕ, by a 2×2 matrix:

$$\begin{bmatrix} \Delta\theta \\ \Delta\phi \end{bmatrix} = \begin{bmatrix} A_{xx} & A_{xy} \\ A_{yx} & A_{yy} \end{bmatrix} \begin{bmatrix} V_x \\ V_y \end{bmatrix}$$

Projection optics 28 are translated by simultaneously driving actuators 52 and 98 to multiple positions over their two-dimensional range. The scan angles Δθ and Δϕ, as well as the differential voltages $V_x$ and $V_y$, are measured and recorded for each position as in the first calibration method, and the values for matrix elements $A_{xx}$, $A_{xy}$, $A_{yx}$, and $A_{yy}$ are calculated by processor 50 for each of these positions. The values of the matrix elements $A_{xx}$, $A_{xy}$, $A_{yx}$, and $A_{yy}$ for each position Δθ and Δϕ are stored by processor 50 as a look-up table.

During actual depth mapping, the look-up table between the differential signals $V_x$ and $V_y$ and the matrix elements $A_{xx}$, $A_{xy}$, $A_{yx}$, and $A_{yy}$ is used by processor 50 to determine the scan angles Δθ and Δϕ from the differential signals $V_x$ and $V_y$. For differential signals between the values $V_x$ and $V_y$ in the look-up table, the scan angles Δθ and Δϕ may be determined by processor 50 by interpolating the values of the matrix elements $A_{xx}$, $A_{xy}$, $A_{yx}$, and $A_{yy}$ in the look-up table.

In another embodiment, only one photodiode is used for each direction of translation. For example, photodiodes 56*a* and 96*a* are used, whereas photodiodes 56*b* and 96*b* are not used or absent. In this single-ended configuration, the signals used for calibration and measurement are $V_x = V_{x+}$ and $V_y = V_{y+}$.

As noted earlier, although FIGS. 7*a*-*b* illustrate monitoring of two-dimensional translation of projection optics 28 using mirror array 72, the monitoring method illustrated in FIG. 3, using higher diffracted orders propagating within DOE 34, may be applied in similar fashion.

Figure 8A:
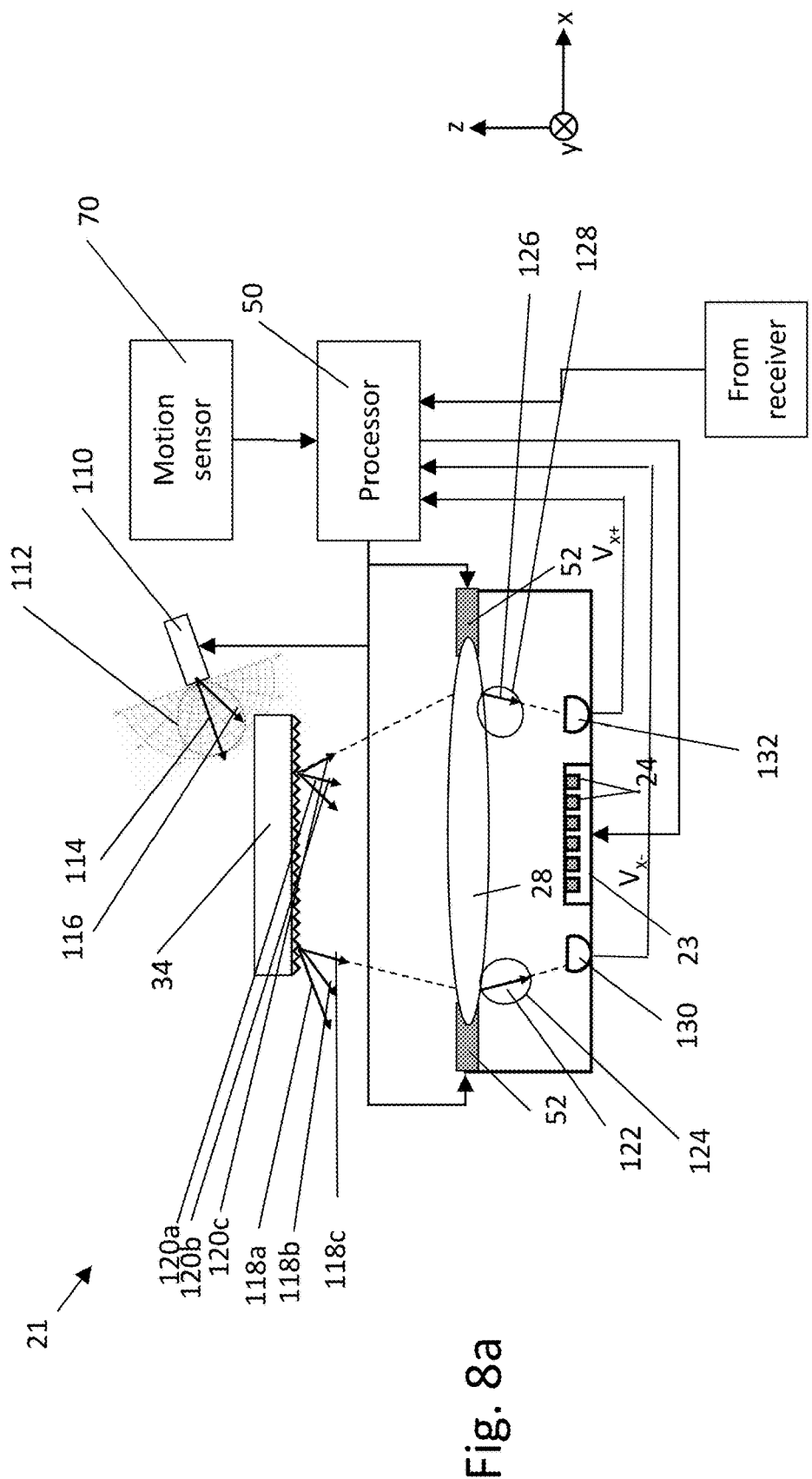
FIGS. 8a-b are schematic side views of a projector with angular beam scanning, in accordance with another embodiment of the invention.
Figure 8B:
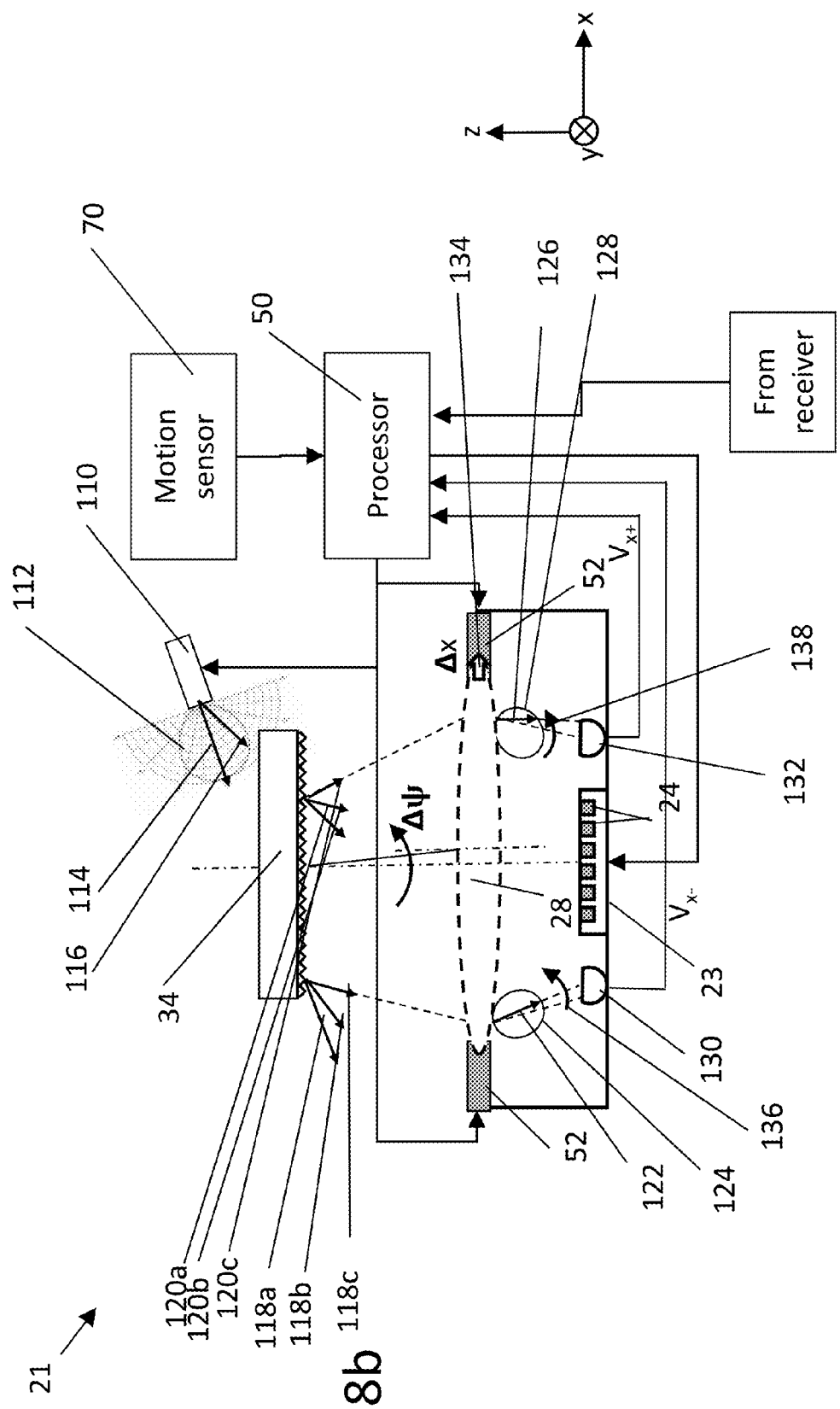

FIGS. 8*a*-*b* are schematic side views of projector 21 with beam scanning, in accordance with another embodiment of the invention.

In FIG. 8*a* the following components are the same as those illustrated in FIGS. 3-4: VCSEL array 23, projection optics 28, DOE 34, processor 50, and motion sensor 70. In this case, however, for the purpose of monitoring the translation of projection optics 28, a secondary radiation source 110 is positioned to illuminate DOE 34 from an off-axis position, so as not to interfere with the radiation emitted by projector 21. Secondary radiation source 110 comprises, for example, an LED or a diffused laser. The angular radiation pattern of secondary radiation source 110 is illustrated by a polar diagram 112. For illustrating the ray paths relevant for monitoring the translation of projection optics 28, two rays 114 and 116 emitted by secondary radiation source 110 have been drawn.

Rays 114 and 116 impinge on DOE 34, and are diffracted, respectively, into diffracted rays 118*a*-*c* and 120*a*-*c*. Of these diffracted rays, 118*c* and 120*c* impinge on projection optics 28, and are refracted to form rays 122 and 126, respectively. The angular radiation patterns around each of rays 122 and 126 are illustrated by polar diagrams 124 and 128, respectively. Rays 122 and 126, together with their respective angular radiation patterns 124 and 128, impinge on respective photodiodes 130 and 132. Photodiodes 130 and 132 are typically (but not necessarily) in proximity to VCSEL array 23 and may be disposed on the same substrate as the VCSEL array. Their respective output signals $V_{x+}$ and $V_{x-}$ are coupled to processor 50.

FIG. 8*b* illustrates the effect of translating projection optics 28. When projection optics 28 are translated by Δx as indicated by an arrow 134, rays 122 and 126, together with their respective associated angular radiation patterns 124 and 128, rotate as indicated by respective arrows 136 and 138. Due to the angular dependence of radiation patterns 124 and 128, the optical powers received and sensed by photodiodes 130 and 132 change as a function of the translation of projection optics 28. For the purpose of displaying the output signals of photodiodes 130 and 132 as functions of the translation of projection optics 28, an angle Δψ is defined as follows: It is the angle between the optical axis of fully aligned projection optics 28 (no translation) and the line connecting the centers of translated projection optics 28 and DOE 34. Thus, for fully aligned projection optics 28, $\Delta\psi=0$.

Figure 9:
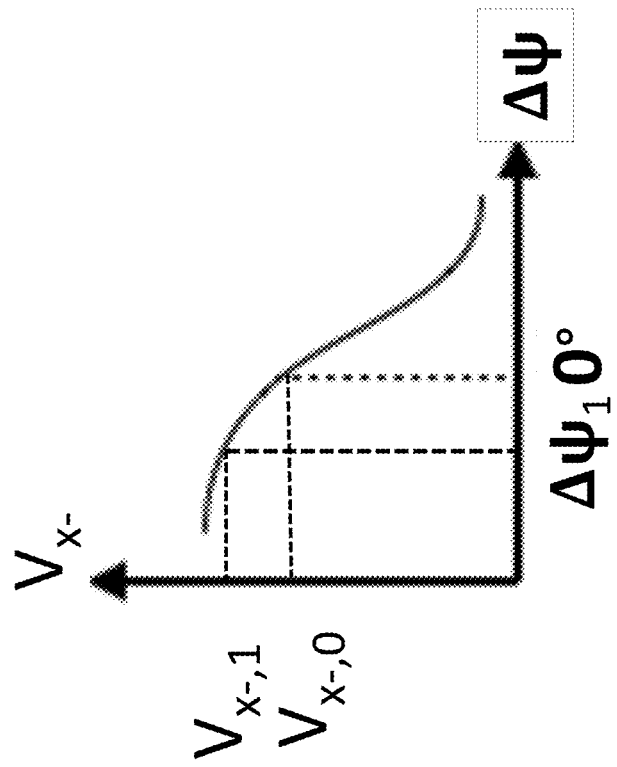
FIG. 9 is a schematic plot of the response of a translation sensor, in accordance with another embodiment of the invention.

FIG. 9 is a schematic illustration, as an example, of the signal $V_{x-}$ emitted by photodiode 130 of FIGS. 8*a-b* as a function of angle $\Delta\psi$, based on the radiation pattern of an LED with a diameter of 85 microns, and emission spectrum centered at 860 nm. When projection optics 28 are in their fully aligned state (no translation), angle $\Delta\psi$ is zero, and photodiode 130 emits a signal $V_{x-,0}$. For a translation of projection optics 28 as illustrated in FIG. 8*b*, angle $\Delta\psi$ assumes a non-zero value $\Delta\psi_1$. Due to the rotation of angular radiation pattern 124, the signal emitted by photodiode 130 increases to a value of $V_{x-,1}$. A similar illustration (not shown) would demonstrate the behavior of signal $V_{x+}$ emitted by photodiode 132.

Figure 10C:
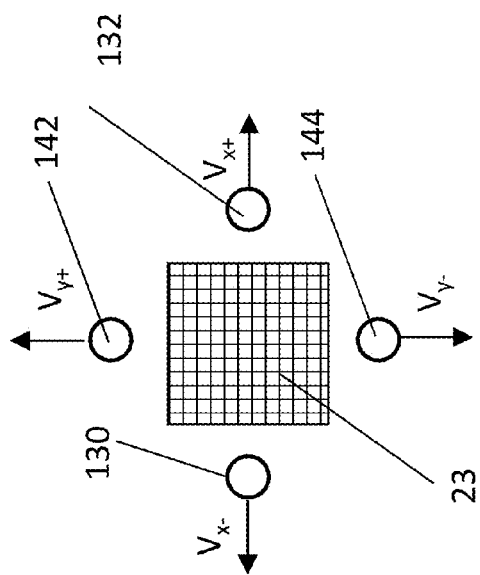
FIGS. 10a-c are schematic top views of sections of a projector with angular beam scanning, in accordance with an embodiment of the invention.
Figure 10A:
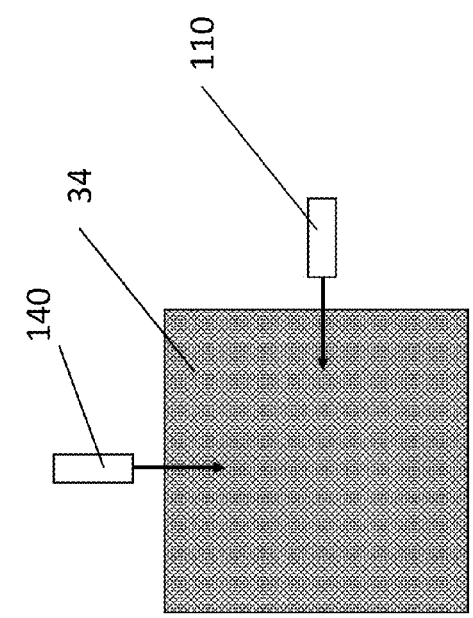
Figure 10B:
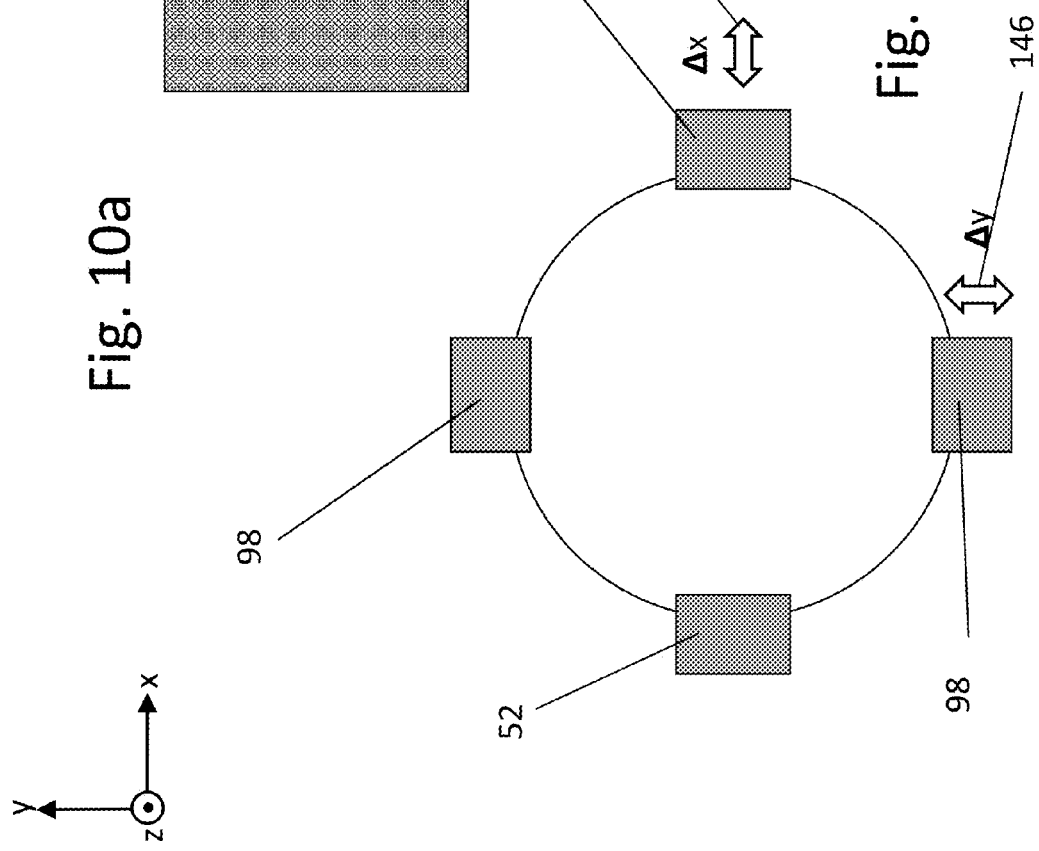

FIGS. 10*a-c* are schematic top views of sections of projector 21 with beam scanning, in accordance with an embodiment of the invention. These figures illustrate a two-dimensional translation of projection optics 28, with the parts for translation in x-direction being the same as in FIGS. 8*a-b*.

FIG. 10*a* illustrates two secondary radiation sources 110 and 140 illuminating DOE 34, wherein secondary radiation source 110 (as in FIGS. 8*a-b*) illuminates primarily in x-direction, and secondary radiation source 140 illuminates primarily in y-direction.

FIG. 10*b* illustrates the translation of projection optics 28 in the x- and y-directions by respective actuators 52 and 98. Arrows 134 and 146 indicate the translations in x- and y-direction, respectively.

FIG. 10*c* illustrates two pairs of photodiodes adjacent to VCSEL array 23. Photodiodes 130 and 132 receive and sense radiation affected primarily by the translation of projection optics 28 in the x-direction (as in FIGS. 8*a-b*). Their respective output signals, coupled to processor 50, are $V_{x-}$ and $V_{x+}$. Photodiodes 142 and 144 receive and sense radiation affected primarily by the translation of projection optics 28 in the y-direction. Their respective output signals, coupled to processor 50, are $V_{y+}$ and $V_{y-}$.

Signals $V_{x+}$, $V_{x-}$, $V_{y+}$, and $V_{y-}$ may be used for differential detection as described above in the context of FIGS. 7*a-b*. Furthermore, calibration procedures may be implemented as described in the same context It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
   a pattern projector, comprising optical components arranged along an optical axis, the optical components comprising:
      a radiation source, which is configured to emit optical radiation;
      projection optics configured to collect and collimate the optical radiation emitted by the radiation source; and
      a diffractive optical element (DOE), which is positioned to receive the optical radiation collimated by the projection optics and to produce and project a pattern toward a target;
   an actuator configured to translate the projection optics in a direction transverse to the optical axis;
   an optical sensor configured to detect an optical signal that is indicative of a shift of the projected pattern; and
   a processor, which is configured to drive the actuator to translate the projection optics responsively to the optical signal detected by the optical sensor.

2. The optical apparatus according to claim 1, wherein the radiation source emits the optical radiation with a predefined spatial pattern, and the pattern projected by the DOE comprises multiple replicas of the predefined spatial pattern.

3. The optical apparatus according to claim 1, wherein a portion of the collimated radiation received by the DOE is diffracted by the DOE to orders that propagate inside the DOE to a side surface of the DOE and exit therefrom, and wherein the sensor comprises at least one radiation detector, which is positioned in proximity to the side surface so as to receive and sense an intensity of the radiation that has exited through the side surface.

4. The optical apparatus according to claim 1, and comprising a transparent substrate having a face shaped to define a plurality of optical deflectors and positioned parallel to the DOE so as to intercept and reflect a portion of the projected pattern, the transparent substrate comprising at least one side surface which is not parallel to the first face, and wherein the sensor comprises at least one radiation detector, which is positioned so as to receive and sense an intensity of the radiation reflected by the optical deflectors.

5. The optical apparatus according to claim 1, and comprising at least one secondary radiation source, which is configured to direct further radiation to impinge on the DOE along a direction non-parallel to the optical axis, and wherein the sensor comprises at least one radiation detector positioned to receive a portion of the further radiation that is diffracted by the DOE.

6. The optical apparatus according to claim 5, wherein the at least one radiation detector is mounted on a substrate together with the radiation source that emits the optical radiation projected in the pattern.

7. The optical apparatus according to claim 1, wherein the sensor comprises multiple optical detectors disposed on different sides of the optical axis.

8. The optical apparatus according to claim 7, wherein the actuator is configured to translate the projection optics in multiple directions transverse to the optical axis responsively to signals from the multiple optical detectors.

9. The optical apparatus according to claim 1, and comprising a motion sensor configured to output a motion signal indicative of changes in a position of the optical apparatus, wherein the processor is configured to drive the actuator to both the optical signal and the motion signal.

10. The optical apparatus according to claim 1, wherein the processor is configured to drive the actuator responsively to the optical signal so as stabilize the projected pattern.

11. The optical apparatus according to claim 1, and comprising a receiver, which is configured to form an image of the pattern on the target, wherein the processor is configured to process the image so as to generate a three-dimensional (3D) map of the target.

12. The optical apparatus according to claim 11, wherein the processor is configured to drive the actuator in order to shift the projected pattern so as to enhance a resolution of the 3D map.

13. A method for projection, comprising:
   projecting a pattern toward a target by directing optical radiation, which is collimated along an optical axis by projection optics, through a diffractive optical element (DOE);

detecting an optical signal that is indicative of a shift of the projected pattern; and driving an actuator to translate the projection lens in a direction transverse to the optical axis responsively to the detected optical signal.

14. The method according to claim 13, wherein a portion of the collimated radiation received by the DOE is diffracted by the DOE to orders that propagate inside the DOE to a side surface of the DOE and exit therefrom, and wherein detecting the optical signal comprises sensing an intensity of the radiation that has exited through the side surface.

15. The method according to claim 13, and comprising directing further radiation to impinge on the DOE along a direction non-parallel to the optical axis, wherein detecting the optical signal comprises sensing a portion of the further radiation that is diffracted by the DOE.

16. The method according to claim 13, wherein detecting the optical signal comprises sensing receiving signals from multiple optical detectors disposed on different sides of the optical axis, and wherein driving the actuator comprises translating the projection optics in multiple directions transverse to the optical axis responsively to the signals from the multiple optical detectors.

17. The optical method according to claim 13, and comprising sensing motion of at least one of the projection optics and the DOE, wherein driving the actuator comprises translating the projection lens responsively to both the optical signal and the sensed motion.

18. The method according to claim 13, wherein the actuator is driven responsively to the optical signal so as to stabilize the projected pattern.

19. The method according to claim 13, and comprising capturing an image of the pattern on the target, and processing the image so as to generate a three-dimensional (3D) map of the target.

20. The optical method according to claim 19, wherein driving the actuator comprises shifting the projected pattern so as to enhance a resolution of the 3D map.

* * * * *